US012784304B2

(12) United States Patent
Reid et al.

(10) Patent No.: US 12,784,304 B2
(45) Date of Patent: Nov. 3, 2026

(54) CRITICAL SYMBOL MONITORING FOR COLOR DISPLAYS

(71) Applicant: Rockwell Collins, Inc., Cedar Rapids, IA (US)

(72) Inventors: Alexander D. Reid, Tualatin, OR (US); Nixon G. Lange, Tigard, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 247 days.

(21) Appl. No.: 18/735,862

(22) Filed: Jun. 6, 2024

(65) Prior Publication Data

US 2025/0377538 A1 Dec. 11, 2025

(51) Int. Cl.
*G06T 11/60* (2026.01)
*G02B 27/01* (2006.01)
*G08B 21/02* (2006.01)

(52) U.S. Cl.
CPC .......... *G06T 11/60* (2013.01); *G02B 27/0101* (2013.01); *G08B 21/02* (2013.01); *G02B 2027/0112* (2013.01); *G06T 2210/62* (2013.01)

(58) Field of Classification Search
CPC ........... G08B 5/36; G08B 21/02; G06T 11/60; G06T 2210/62; G02B 27/0101; G02B 2027/0112
USPC .......................................................... 345/589
See application file for complete search history.

(56) References Cited

U.S. PATENT DOCUMENTS

| | | | |
|---|---|---|---|
| 7,212,175 B1 | 5/2007 | Magee et al. | |
| 8,699,781 B1 | 4/2014 | Bold | |
| 9,932,126 B2 * | 4/2018 | Catton | G09G 5/14 |
| 10,902,275 B2 | 1/2021 | Atac et al. | |
| 2017/0168560 A1 | 6/2017 | Sacheau et al. | |
| 2025/0022300 A1 * | 1/2025 | Nagy | G06V 20/46 |

* cited by examiner

*Primary Examiner* — Jacinta M Crawford
(74) *Attorney, Agent, or Firm* — Suiter Swantz IP

(57) ABSTRACT

A head-up display system utilizes various color channels for critical symbol monitoring. The display application identifies an unused color in the display and renders markers for locations of critical symbols in the unused color. A separate processor executing monitoring application determines if the markers are located where the critical symbols are expected to be. The display system and monitoring processor communicate the marker rendering color such that the color may be dynamically updated if necessary. The system may utilize the alpha channel of the graphics processing unit for critical symbol markers. Alternatively, the head-up display system may reduce color depth by apportioning certain bits for each color to create a CSM identifier.

20 Claims, 2 Drawing Sheets

CRITICAL SYMBOL MONITORING FOR COLOR DISPLAYS

BACKGROUND

The Critical Symbol Monitor (CSM) is the primary attitude safety monitor for head-up displays (HUDs) used to meet failure conditions for hazard classifications of Hazardous or Catastrophic. However, the CSM is implemented by taking advantage of the fact that HUD displays are monochrome so that the blue channel can be used to mark the location of critical symbols. In a transparent display, color use is limited because the background can change.

Technology advances will enable use of Color on the HUD. A new mechanism is needed for marking the location of critical symbols.

SUMMARY

In one aspect, embodiments of the inventive concepts disclosed herein are directed to a head-up display system that utilizes various color channels for critical symbol monitoring. The display application identifies an unused color in the display and renders markers for locations of critical symbols in the unused color. A separate processor executing monitoring application determines if the markers are located where the critical symbols are expected to be.

In a further aspect, the display system and monitoring processor communicate the marker rendering color such that the color may be dynamically updated if necessary.

In a further aspect, the system may utilize the alpha channel of the graphics processing unit for critical symbol markers. Alternatively, the head-up display system may reduce color depth by apportioning certain bits for each color to create a CSM identifier.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
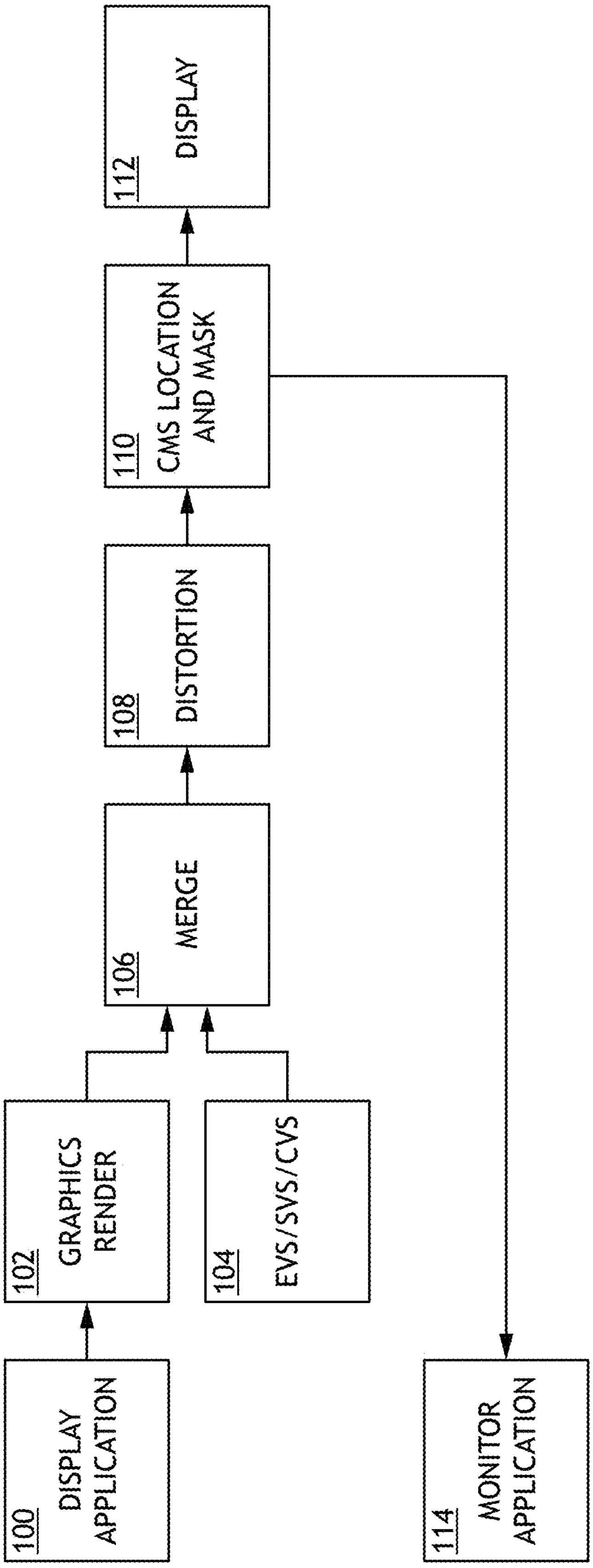
FIG. 1 shows a block diagram of a system according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a head-up display system that utilizes various color channels for critical symbol monitoring. The display application identifies an unused color in the display and renders markers for locations of critical symbols in the unused color. A separate processor executing monitoring application determines if the markers are located where the critical symbols are expected to be. The display system and monitoring processor communicate the marker rendering color such that the color may be dynamically updated if necessary. The system may utilize the alpha channel of the graphics processing unit for critical symbol markers. Alternatively, the head-up display system may reduce color depth by apportioning certain bits for each color to create a CSM identifier.

Referring to FIG. 1, a block diagram of a system according to an exemplary embodiment is shown. A display application 100 in the head-up display system generates graphics and supplies those graphics to a GPU 102 for rendering. A merge process 106 that combines the rendered images and elements from a vision system 104 such as a combined vision system (CVS), enhanced vision system (EVS), synthetic vision system (SVS) or the like. The merged image may undergo some processing such as applying a distortion 108 as defined by the head-up display to correct for optical distortion. A CSM process 110 determines locations of critical symbols and applies a mask as defined herein including critical symbol markers. The resulting image is then displayed on a head-up display 112.

Traditionally, critical symbol marks are rendered in a color separate from the monochrome color of the head-up display 112. In at least one embodiment, the CSM process 110 selects a color or other mechanism that does not interfere with the merged, distorted image. In at least one embodiment, the CSM process 110 may analyze the merged, distorted image to identify some unused portion of the spectrum. The unused portion of the spectrum may be defined by some minimum threshold between used colors. Alternatively, color usage by the GPU may be limited, for example to red and green, leaving blue for CSM identifiers.

Alternatively, in at least one embodiment, the CSM process 110 may reduce the color depth of the Image, for example from eight to six pixels per color, then using the unused bits to create a 6-bit CSM identifier (e.g., the least significant bits of each color channel, most significant bits of each color channel, or the like).

Current critical symbol monitoring systems do not use the alpha channel. In at least one embodiment, the CSM process 110 may utilize the alpha channel in the GPU to indicate CSM identifiers. Bits within the alpha channel may be reserved for alpha channel applications. Alternatively, in at least one embodiment, the CSM process 110 adds a fifth channel to create RGBAC (red, green, blue, alpha, CSM).

It is desirable to monitor the placement of symbology so that an independent processor can determine if its position is correct. A separate monitoring application 114, which may be executed as a separate process thread or via a separate processor or processor core, continuously or periodically monitors the image being sent to the display 112. The horizon line (critical symbol) is rendered on the display 112. The separate monitoring application 114 extracts these critical symbol points from the image and checks that critical symbols are positioned correctly and that pitch and roll are correct.

Based on those data points, the separate monitoring application 114 can determine pitch and roll, and confirm that the display 112 has the correct information displayed.

Figure 2:
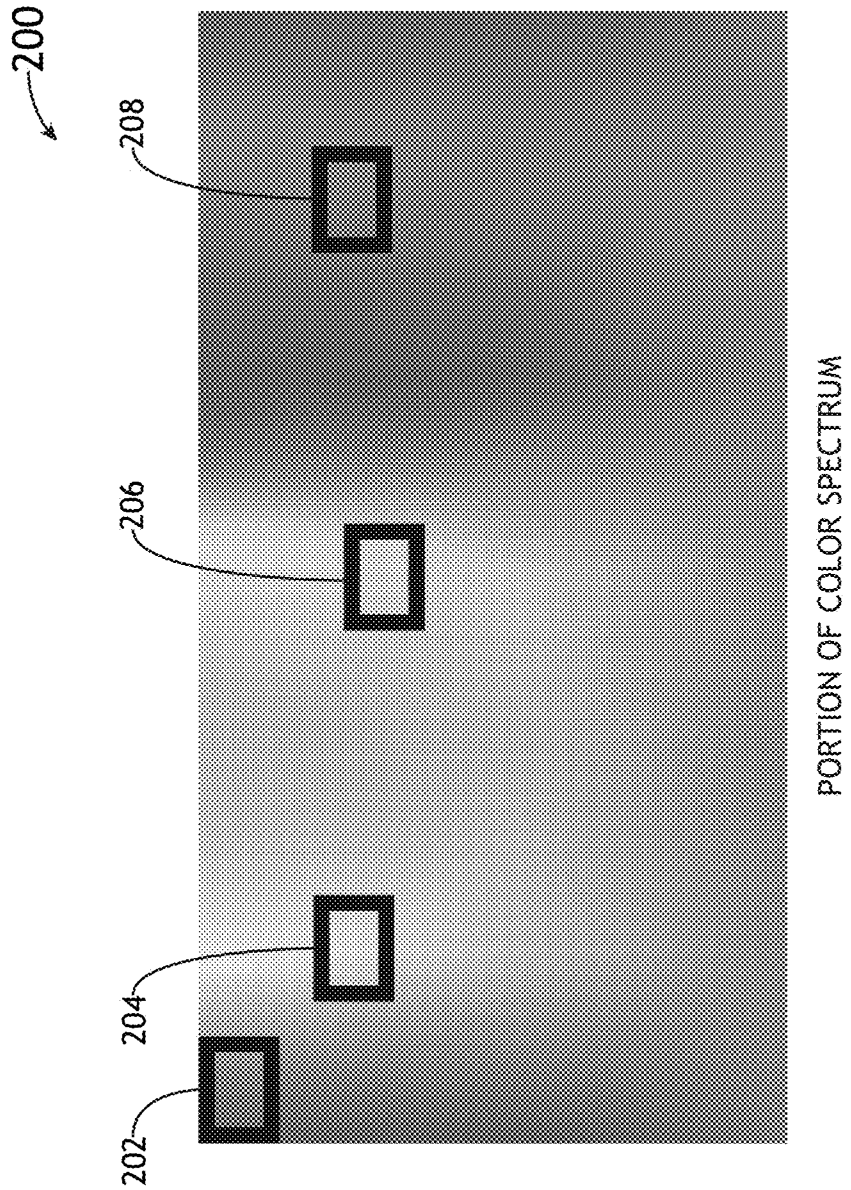
FIG. 2 shows a representation of a palette defining usable colors according to an exemplary embodiment.

Referring to FIG. 2, a representation of a palette 200 (i.e., portion of a color spectrum) defining usable colors according to an exemplary embodiment is shown. The standards for use of color in avionics displays specify the palette 200 of available colors 202, 204, 206, 208 to use: magenta, cyan, white, amber, red, etc. Color HUDs will spread the selected colors 202, 204, 206, 208 away from the precise color defined. Because these colors only cover a small portion of the full set of colors that can be represented in RGB graphics of the HUD, a critical symbol monitoring system can choose colors outside of the allowed palette and use them to mark the location of critical symbols.

Embodiments of the present disclosure enable critical symbol monitoring of the system including the processor, graphics generation, video/symbol merge, and distortion processing (or other post processing before the display image is sent to the display device).

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:

a display; and at least one processor in data communication with a memory storing processor executable code for configuring the at least one processor to:

render an image;

determine a critical symbol rendering coloration;

determine a plurality of critical symbol placements of a plurality of critical symbols in the image;

render a plurality of markers corresponding to the plurality of critical symbol placements in the critical symbol rendering coloration;

combine the image, the markers, and the critical symbols;

render the combined image, markers, and critical symbols on the display; and monitor the critical symbol placements by determining whether the plurality of markers are located where the plurality of critical symbols are expected to be.

2. The computer apparatus of claim 1, wherein the at least one processor comprises two processor, a first processor configured to determine the critical symbol rending coloration, determine the critical symbol placements, combine the image, markers, and the critical symbols, and render the combined image, markers, and critical symbols on the display; and a second processor configured to monitor the critical symbol placement.

3. The computer apparatus of claim 2, wherein:

the first processor is configured to communicate the critical symbol rendering coloration to the second processor;

the second processor is configured to receive the critical symbol rendering coloration; and monitoring the critical symbol placement comprises analyzing the combined image, markers, and critical symbols with respect to the critical symbol rendering coloration.

4. The computer apparatus of claim 1, wherein determining the critical symbol rendering coloration comprises selecting an unused color within a palette defined by the image.

5. The computer apparatus of claim 1, wherein determining the critical symbol rendering coloration comprises defining critical symbol monitor identifies within an alpha channel.

6. The computer apparatus of claim 1, wherein determining the critical symbol rendering coloration comprises reducing color depth in each of a plurality of color channels, and defining critical symbol monitor identifiers utilizing unused bits.

7. The computer apparatus of claim 1, wherein determining the critical symbol rendering coloration comprises defining a separate color channel comprising critical symbol monitor identifiers.

8. A method for monitoring critical symbol placement comprising:
rendering an image;
determining a critical symbol rendering coloration;
determining a plurality of critical symbol placements of a plurality of critical symbols in in the image;
rendering a plurality of markers corresponding to the plurality of critical symbol placements in the critical symbol rendering coloration;
combining the, the markers, and the critical symbols;
rendering the combined image, the markers, and the critical symbols on a display; and
monitoring the critical symbol placements by determining whether the plurality of markers are located where the plurality of critical symbols are expected to be.

9. The method of claim 8, further comprising:
communicating the critical symbol rendering coloration to a critical symbol monitor; and
receiving the critical symbol rendering coloration by the critical symbol monitor,
wherein monitoring the critical symbol placement comprises analyzing the combined image, markers, and critical symbols with respect to the critical symbol rendering coloration.

10. The method of claim 8, wherein determining the critical symbol rendering coloration comprises selecting an unused color within a palette defined by the image.

11. The method of claim 8, wherein determining the critical symbol rendering coloration comprises defining critical symbol monitor identifies within an alpha channel.

12. The method of claim 8, wherein determining the critical symbol rendering coloration comprises reducing color depth in each of a plurality of color channels, and defining critical symbol monitor identifiers utilizing unused bits.

13. The method of claim 8, wherein determining the critical symbol rendering coloration comprises defining a separate color channel comprising critical symbol monitor identifiers.

14. A head-up display system comprising:
a display; and
at least one processor in data communication with a memory storing processor executable code for configuring the at least one processor to:
render an image;
determine a critical symbol rendering coloration;
determine a plurality of critical symbol placements of a plurality of critical symbols in the image;
render a plurality of markers corresponding to the plurality of critical symbol placements in the critical symbol rendering coloration;
combine the image, the markers, and the critical symbols;
render the combined image, markers, and critical symbols on the display; and
monitor the critical symbol placements by determining whether the plurality of markers are located where the plurality of critical symbols are expected to be.

15. The head-up display system of claim 14, wherein the at least one processor comprises two processor, a first processor configured to determine a critical symbol rending coloration, determine a critical symbol placement, combine the image and the critical symbol, and render the combined image, markers, and critical symbols on the display; and a second processor configured to monitor the critical symbol placement.

16. The head-up display system of claim 15, wherein:
the first processor is configured to communicate the critical symbol rendering coloration to the second processor;
the second processor is configured to receive the critical symbol rendering coloration; and
monitoring the critical symbol placement comprises analyzing the combined image, markers, and critical symbols with respect to the critical symbol rendering coloration.

17. The head-up display system of claim 14, wherein determining the critical symbol rendering coloration comprises selecting an unused color within a palette defined by the image.

18. The head-up display system of claim 14, wherein determining the critical symbol rendering coloration comprises defining critical symbol monitor identifies within an alpha channel.

19. The head-up display system of claim 14, wherein determining the critical symbol rendering coloration comprises reducing color depth in each of a plurality of color channels, and defining critical symbol monitor identifiers utilizing unused bits.

20. The head-up display system of claim 14, wherein determining the critical symbol rendering coloration comprises defining a separate color channel comprising critical symbol monitor identifiers.

* * * * *